United States Patent [19]
Gregory et al.

[11] Patent Number: 4,814,622
[45] Date of Patent: Mar. 21, 1989

[54] HIGH SPEED SCANNING TUNNELING MICROSCOPE

[75] Inventors: Stephen Gregory, Middletown Township, Monmouth County; Charles T. Rogers, Jr., Oceanport Borough, both of N.J.

[73] Assignee: Bell Communications Research, Inc., Livingston, N.J.

[21] Appl. No.: 117,754

[22] Filed: Nov. 6, 1987

[51] Int. Cl.$^4$ .................... H01J 37/26; G01N 23/00
[52] U.S. Cl. .................................. 250/306; 250/423 F
[58] Field of Search ................ 250/306, 307, 423 F, 250/442.1; 310/331

[56] References Cited

U.S. PATENT DOCUMENTS

| | | | |
|---|---|---|---|
| 3,928,778 | 12/1975 | Ivanov et al. | 310/331 |
| 3,952,215 | 4/1976 | Sakitani | 310/8.1 |
| 4,163,168 | 7/1979 | Ishikawa et al. | 250/442.1 |
| 4,343,993 | 8/1982 | Bimmig et al. | 250/306 |
| 4,423,347 | 12/1983 | Kleinschmidt et al. | 310/331 |
| 4,506,154 | 3/1985 | Scire | 250/442.1 |
| 4,510,412 | 4/1985 | Suda et al. | 310/331 |
| 4,523,120 | 6/1985 | Assard et al. | 310/331 |
| 4,622,483 | 11/1986 | Staufenberg et al. | 310/331 |
| 4,724,318 | 2/1988 | Bimmig | 250/306 |

OTHER PUBLICATIONS

"Scanning Tunneling Microscopy", *Surface Science*, G. Binnig, H. Rohrer, vol. 126 (1983), pp. 236-244.
"High-Stability Scanning Tunneling Microscope", *Review of Scientific Instruments*, G. F. A. van de Walle, et al., 56 (8), Aug. 1985, pp. 1573-1576.
"News: Search and Discovery-Physics Nobel Prize Awarded for Microscopies Old and New", *Physics Today*, D. Schwarzchild, Jan. 1987, pp. 17-21.

*Primary Examiner*—Bruce C. Anderson
*Attorney, Agent, or Firm*—James W. Falk

[57] ABSTRACT

A scanning tunneling microscope with a stage capable of coarse motion in the horizontal (or X Y) plane and also capable of fine or scanning motion in the X, Y and Z directions. The stage comprises a square array of nine blocks connected by twelve PZTs, with clamping feet on the four corner blocks. The clamping feet can be electrically clamped to a horizontal surface. The underside of the center block holds the surface to be studied. By selectively clamping pairs of the feet and expanding and contracting groups of the PZts, the stage can be made to walk anywhere on the horizontal surface. A tunneling tip is supported atop a novel vertical crawler which is mounted in a vertical bore in a base unit. The vertical crawler provides coarse Z-axis positioning. Scanning or fine motion is achieved by clamping all four of the stage's feet while groups of the PZTs which connect the blocks are selectively activated.

14 Claims, 3 Drawing Sheets

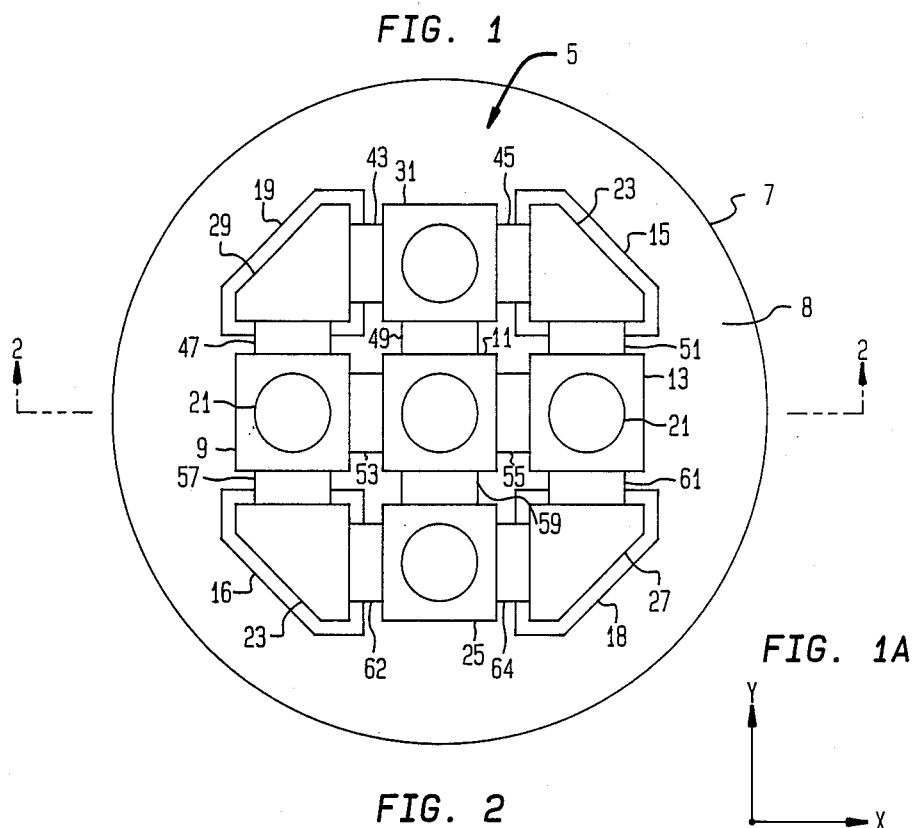
FIG. 1
FIG. 1A
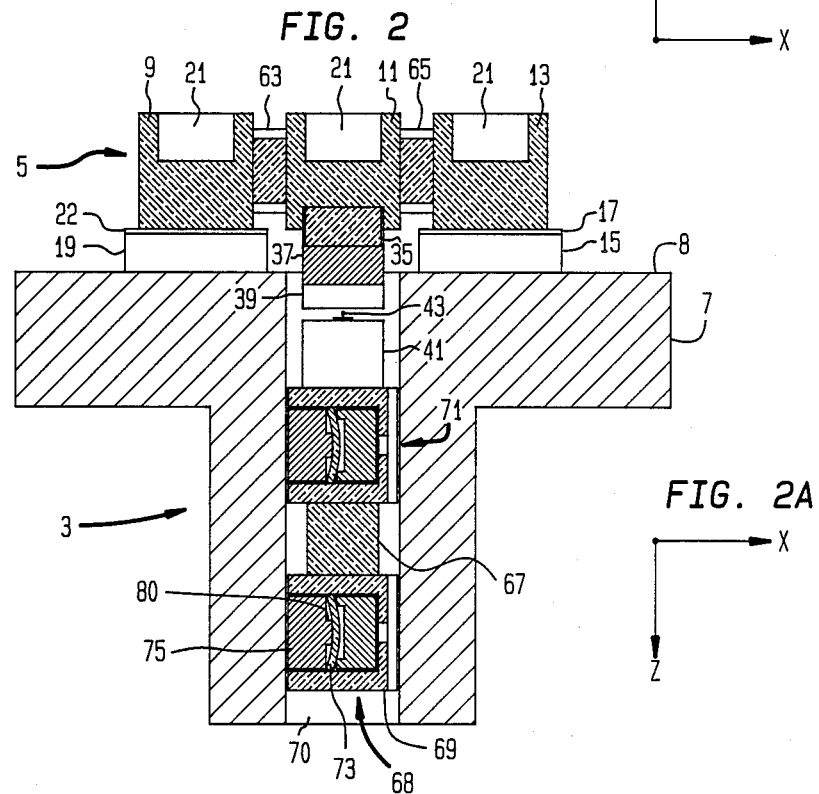
FIG. 2
FIG. 2A

HIGH SPEED SCANNING TUNNELING MICROSCOPE

FIELD OF THE INVENTION

The invention relates to a novel scanning tunneling microscope (STM) and more particularly to such a microscope with a novel sample positioning and scanning system.

BACKGROUND OF THE INVENTION

Binnig and Rohrer first successfully demonstrated vacuum tunneling in 1981 and soon thereafter built a vacuum STM which could image topographic features of metal and semiconductor surfaces with resolution on an atomic scale. Previous attempts to construct a device to study surface topography electronically had utilized field emission to produce a current from a tip, which tip was moved or scanned closely adjacent to the surface or sample to be studied. By using tunneling instead of field emission to generate the current, much higher resolution can be attained. If the tip-to-sample voltage is reduced below that which results in field emission and the gap made sufficiently small, a tunneling current flows across the vacuum between the tip and sample. The tunneling current is steeply (exponentially) dependent on the gap width. Thus changes in tunneling current of an order of magnitude can be achieved by a gap change of an Angstrom.

An STM comprises means to establish a tunneling current between a metal tip and a closely adjacent surface to be studied. If the tip is moved relative to and parallel to the surface at a constant distance therefrom, the tunneling current will fluctuate as the tip passes over the hills and valleys of the irregular surface, increasing when a hill is encountered and decreasing when a valley is encountered. By measuring the tunneling current and correlating it with the exponential relationship of this current with the gap, the surface topography can be deduced. In most STMs the tip is scanned parallel to the surface (in the X-Y plane) by means of X and Y piezoelectric transducers (PZTs) and the tip-to-sample distance or gap is controlled by a third Z-axis PZT. A feedback system senses the tunneling current and maintains this current constant by electrically actuating the Z-axis PZT. With this apparatus the tip electrode follows the surface profile of the sample and also the feedback voltage which actuates the Z-axis PZT will vary as does the profile; this voltage can be simply applied to a CRT or to a plotter to obtain a profile display. By the systematic scanning of adjacent lines (as in television scanning), a three-dimensional contour map of the surface can be obtained.

An STM must be free of thermal drift caused by differential expansion of materials with different thermal expansion coefficients, it should be mechanically isolated from its environment, it should not be influenced by internal mechanical resonances, it should operate at high scanning speed, and it may be required to operate under ultra high vacuum (UHV). The large size of early STMs made them susceptible to ambient vibration which necessitated vibration-damping expedients such as elaborate magnetic levitation by means of superconductivity. Present-day STMs have been miniaturized so that mechanical self-resonance is not such a problem.

The prior art includes walking sample holders (or stages) for electron microscopes with which the sample under study can be coarsely adjusted, for positioning, preparatory to the scanning or viewing of a local area thereof. These walking sample holders utilize PZTs with feet attached to the ends thereof. The feet can be selectively electronically clamped to a metallic substrate across which the entire assembly walks. The walking motion occurs in step-by-step fashion. Each step comprises expanding the PZT by means of an applied voltage with the forward foot unclamped and the aft or rear foot clamped to the substrate by means of a voltage applied between the dielectric-coated metallic foot and the conducting substrate. The forward foot is then clamped in a similar fashion and the aft foot unclamped. The PZT voltage is then removed and the resultant contraction of the PZT causes the aft foot to move forward. A repetition of this cycle will cause further movement. Motion in the opposite direction can be achieved by changing the sequence of the clamping and unclamping of the feet. A walking stage or specimen holder of this linear type for a conventional electron microscope is shown and described in the Sakitani Pat. No. 3,952,215, issued on Apr. 20, 1976.

The STM inventors Binnig and Rohrer in an article in the journal *Surface Science*, Vol. 126 (1983), pp. 236–244 show an STM with X and Y piezodrives connected to the tunnel tip for scanning it parallel to the surface under study and a Z piezodrive connected to vary the tip-to-surface gap. The surface to be studied is supported on a rough or coarse drive system called a "louse", which comprises a piezoelectric plate mounted on three feet which can be electrostatically clamped to a horizontal substrate. Electrically elongating and contracting of the plate with coordinated clamping and unclamping of the feet will move this louse in any direction in the horizontal plane. The sample is supported by the louse in the vertical plane with the tip mounted horizontally adjacent thereto. The gap is varied in the horizontal direction by a PZT on which the tip is mounted. This arrangement only allows coarse positioning along one axis in the sample plane.

In an article entitled *High-Stability Scanning Tunneling Microscope*, by Van de Walle et al. in the *Review of Scientific Instruments*, 56(8), August 1985, the authors describe an STM with a scanning (or fine positioning) system comprising a square array of nine stainless steel blocks connected together by means of twelve small piezoelectric cubes (or PZTs). The center block has the tip attached thereto by means of a Z-axis PZT. The four corner steel blocks are fixed and the tip is scanned in the X-Y plane by electrically activating appropriate groups or arrays of the piezoelectric cubes which connect the steel cubes. For example, if one of the linear arrays of three PZTs which are perpendicular to the desired axis of motion is electrically expanded and the other linear array parallel thereto but on the opposite side of the center cube is simultaneously contracted, the center cube and the tip will be moved along the axis perpendicular to the two linear arrays.

SUMMARY OF THE INVENTION

The present invention comprises a novel STM, which comprises some features similar to those of the prior art described above, as well as other original features, combined to yield a new apparatus with many advantages.

The apparatus comprises an upper "walker" assembly which carries a sample holder on its lower surface on a PZT which provides fine Z-axis motion of the sample mounted on the holder. The walker assembly provides both fine motion along all three axes (X, Y, and Z) and coarse positioning of the sample in the horizontal or X-Y plane, relative to the tip which is mounted below the sample in the bore (or chimney) of a base unit. The walker is mounted on the upper horizontal surface of the base unit and it moves thereon in the X and Y directions. The tip is mounted atop a vertical crawler device which can be moved inside the aforementioned vertical bore of the base unit to provide coarse Z-axis motion for the tip. The vertical crawler utilizes a PZT with a pair of electrically-operable clamps at either end thereof, which utilize PZTs to achieve positive clamping to the walls of the bore.

The walker assembly comprises an array of nine ceramic blocks joined by twelve PZTs, with clamping feet at the four corners thereof. This assembly provides for the fine (or scanning) motion of the sample in the X-Y plane by the coordinated expansion and contraction of linear arrays of the PZTs which join the blocks while the feet are all clamped to a horizontal surface, and also provides for coarse adjustment of the sample in the X-Y plane by selective actuation of groups of the PZTs and the selective clamping and unclamping of pairs of the feet.

It is thus an object of the invention to provide an STM with a walker assembly which is adapted to carry a sample near the center of its lower surface and wherein the walker is adapted to move on the upper horizontal surface of a base unit in which a tunneling tip is mounted and wherein the walker is adapted to provide both fine (or scanning) motion of the sample relative to said tip and to provide coarse motion of the sample in the X-Y plane.

Another object of the invention is to provide a novel STM comprising a movable walker or stage for supporting a sample to-be studied, and which stage is capable of providing large or coarse motion in the X-Y plane relative to a tip mounted adjacent to the sample and which stage is further capable of having its corners clamped in place and the sample scanned with fine motion along the X, Y and Z axes relative to the tip.

A further object is to provide a novel STM apparatus which is capable of video rate scanning speeds, is not adversely affected by ambient vibration, and is thermally stable.

A still further object is to provide a movable stage for an STM which can alternately provide for coarse and fine movement of a sample relative to a tunneling tip supported adjacent thereto and which stage is mechanically rigid, is thermally stable, is composed of lightweight materials, and can be mounted in a high vacuum chamber and remotely controlled from external electrical devices.

Another object of the invention is to provide a movable stage for an STM comprising an array of ceramic blocks connected by PZTs, which stage can walk in any direction in the X-Y plane by alternately clamping and unclamping pairs of the blocks to a horizontal substrate while groups of the PZTs are electrically expanded or contracted, and whereby all of the pairs of blocks may be simultaneously clamped to the substrate and groups of the PZTs expanded or contracted to provide for scanning motion in the X-Y plane of the center block of the array of blocks.

Another object of the invention is to provide a novel STM comprising a base unit with a vertical bore therein, a tunneling tip supported inside the bore on a movable vertical crawler, a walker assembly mounted on the horizontal surface of the base unit, the walker assembly comprising an array of ceramic blocks connected by PZTs with feet attached to the corner blocks of the walker assembly, the feet being selectively clampable to the upper surface, and a sample-to-be-studied supported on the underside of the walker assembly adjacent to the tip, and means to apply electrical signals to the PZTs and feet of the walker whereby it may be coarsely moved in the X-Y plane or may be scanned with fine motion in the same plane.

A further object is to provide a linear motor (or vertical crawler) capable of climbing up or down a vertical bore, comprising a PZT with electrically-operable clamps at either end thereof, wherein the clamps are capable of electrically expanding to provide positive clamping to the walls of the vertical bore.

These and other objects and advantages of the invention will become apparent from the following detailed description and the drawings.

BRIEF DESCRIPTION OF THE DRAWING

FIG. 1 is a top view of a preferred embodiment of the apparatus of the invention.

FIG. 2 is an elevation view of the apparatus taken along the line 2—2 of FIG. 1.

FIGS. 1a and 2a show the orientation of the mutually orthogonal axes X, Y and Z relative to the apparatus of FIGS. 1 and 2, respectively.

DETAILED DESCRIPTION

Figure 3:
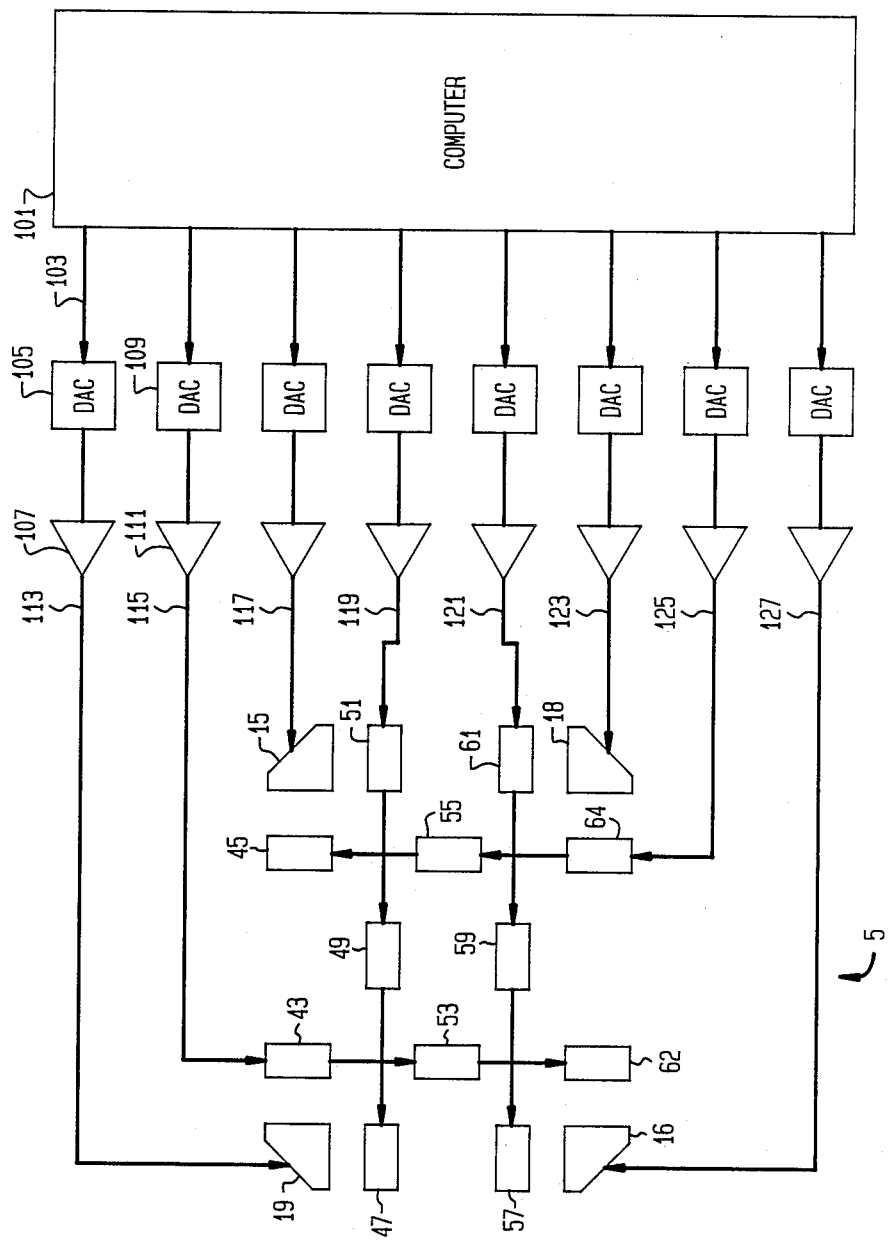
FIG. 3 illustrates electrical circuitry which may be used to operate the apparatus of FIGS. 1 and 2.

In the illustrative apparatus of FIGS. 1 and 2, reference numeral 5 indicates the upper walker assembly which is adapted to move horizontally (in the X-Y plane) over the upper horizontal surface 8 of the base unit 3. The walker comprises an array of nine lightweight glass-ceramic blocks, 29, 31, 23, 9, 11, 33, 23, 25, and 27, arranged in a 3 x 3 square array. The blocks are connected to each other by twelve piezoelectric transducers (PZTs) 43, 45, 47, 49, 51, 57, 59, 61, 62, and 64. Silver epoxy is used to bond the PZTs to the ceramic blocks and to form the PZT electrodes. The numerals 63 and 65 in FIG. 2 indicate one of the electrodes for each of the PZTs 53 and 55 shown in FIG. 1. All of the blocks except the corner ones, which are beveled, are provided with recesses on their top surfaces to reduce the weight. These recesses are indicated by the numerals 21 in FIGS. 1 and 2. The ceramic blocks chosen for this embodiment were of lightweight, machinable glass-ceramic material trademarked Macor, which is a product of the Corning Glass Works. This walker structure is rigid and lightweight and as a result it exhibits fundamental mechanical resonance at more than 30 kHz. The small size of the walker assembly also contributes to its high resonant frequency. The nine-block array measures approximately 1.25×1.25 inches, and the bore 70, described below $\frac{3}{8}$×154 inches.

The feet on which the upper assembly walks to provide coarse horizontal (or X-Y) plane motion are attached to the undersides of the four corner blocks. These four clamping feet are referenced as 15, 16, 18 and 19. These feet are of dielectric-coated metal and have conductive electrodes on their upper surfaces, such as the electrode 17 of the foot 15 and the electrode 22 for the foot 19, as illustrated in FIG. 2. If a voltage is applied between these electrodes and the metallic frame 7 of the base unit the foot will be clamped to the horizontal surface 8. With no applied voltage the feet are free to slide along this surface.

The central ceramic block 11 has fine Z-axis motion PZT 35 attached to its underside. The PZT 35 has the sample holder 37 attached thereto. A sample 39 is shown mounted on the sample holder. The tip 43 is carried by the vertical crawler of the base unit, to be described.

It is necessary to position the tip over any desired region of the sample being studied, and for this purpose a coarse X-Y positioning system is utilized. The achieve coarse positioning in the positive X direction (to the right in FIGS. 1 and 2), the two feet 16 and 19 are clamped to the surface 8 and the two linear arrays of PZTs (43, 53, 62 and 45, 55, 64) on opposite sides of the center block are all expanded by applying a voltage thereto. This will move the unclamped feet 15 and 18 to the right whereupon feet 15 and 18 are clamped, the feet 16 and 19 unclamped and then the two linear arrays of PZTs all electrically contracted to move feet 16 and 19 to the right, whereupon this cycle repeats if further movement to the right is desired. Movement to the left in the negative X direction is accomplished by first clamping the two feet 15 and 18, then expanding the same two linear arrays of PZTs, then clamping the two left-hand feet 16 and 19, contracting the PZTs, etc. Y-axis motion is accomplished in an analogous way by the clamping and unclamping of the upper (15 and 19) and lower (16 and 18) pairs of feet with coordinated expansion and contraction of the two linear arrays of PZTs (47, 49, 51 and 57, 59, 61), which are perpendicular to the Y-axis.

Thus to achieve coarse motion along either axis, the two feet in the direction of the desired motion (the leading feet) are first unclamped with the other two feet (the lagging feet) clamped. The six PZTs in the two linear arrays (or group) perpendicular to the axis of motion are then expanded, the lagging feet then unclamped, the leading feet clamped and the same two linear arrays of PZTs contracted to complete one step.

As stated above, the operation of the STM requires fine motion scanning in the X, Y and Z directions. The walker assembly provides this three-axis fine motion relative to the stationary tip. The X-Y plane fine or scanning motion is achieved by clamping all four feet and simultaneously expanding the linear array of PZTs on one side of the center block and contracting the array parallel thereto on the other side thereof. Thus to achieve fine motion along the X-axis, the linear array comprising PZTs 43, 53, and 62 would be all expanded while the parallel array comprising PZTs 43, 53, and 62 would be simultaneously all contracted. This would move the center block and sample to the right. By expanding the right hand linear array of PZTs and contracting the left hand array, the center block will move to the left. Y-axis motion is achieved in an analogous fashion. Thus fine motion is achieved by alternate expansion and contraction of the linear arrays (or groups) of PZTs which are perpendicular to the axis of fine motion desired, with all four feet clamped.

Figure 4:
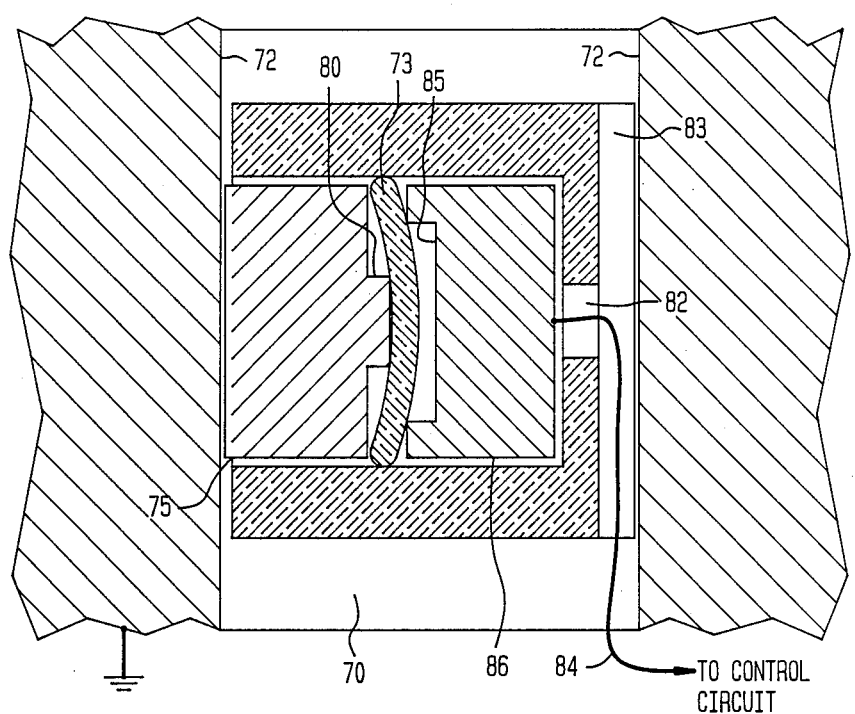
FIGS. 4 and 5 show additional details of the vertical crawler.
Figure 5:
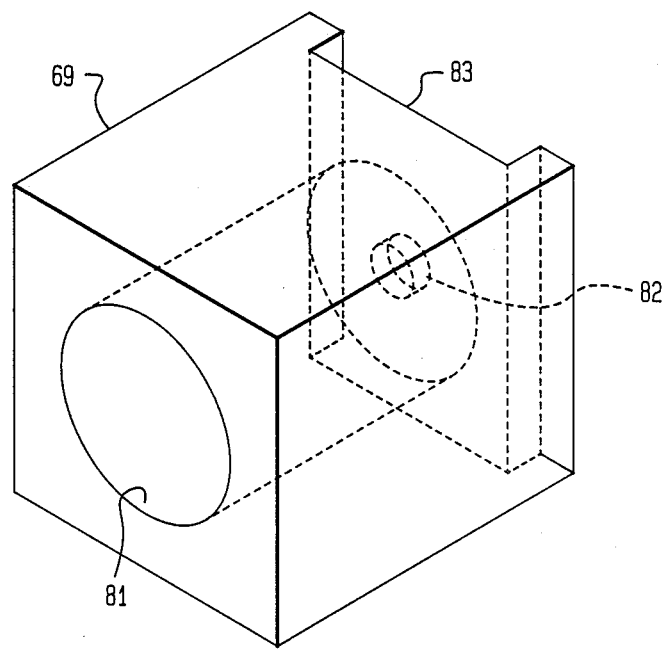

The metal frame (or chassis) 7 of the base unit 3 has a central vertical bore 70 therein in which the vertical crawler device is movably mounted. This device comprises two electrically-operable clamps, 68 and 71, joined by PZT 67. These clamps are identical and FIGS. 4 and 5 show additional details of these clamps. FIG. 4 is a vertical cross-section taken centrally along the base unit of FIG. 2. In this embodiment, the vertical bore 70 has a square cross-section, however, rectangular or circular cross-sections are possible if the two clamps have mating shapes. The clamp of FIGS. 4 and 5 comprises a body 69 which may be of ceramic or some other non-conductive material. The dimensions of body 69 are slightly smaller along the X and Y axes than the bore dimensions. The body is provided with a horizontally-disposed blind circular hole 81 A metallic insert 86 is seated at the end of this hole. The insert 86 has a recess 85 at its outer end. A bimorph-type of PZT 73 is wedged between the insert and the metallic piston 75 which has a central projection 80. The bimorph is normally disc-shaped with slight bulges on its broad faces which give it a slightly lenticular shape. Its electrodes cover virtually all of its broad faces. The parts are dimensioned so that the bimorph will be pushed into the recess 85 by the projection 80 of the piston 75 with the bimorph not electrically activated. The bimorph 73 will thus assume the bowed shape shown in FIG. 4. This bowing of the bimorph can produce sufficient clamping to the bore walls so that the vertical crawler will remain in place with the power off. Electrical actuation of the bimorph by the application thereto of a devoltage of a given polarity will cause it to expand and push the piston against the bore wall with greater force to provide additional clamping force. Reversal of the polarity of the bimorph voltage will cause it to contract and reduce the power-off clamping force. Thus the clamping force can be reduced to zero. This feature facilitates the removal of the crawler from the bore. The right-hand end of the ceramic body 69 has a recess 83 therein and this recess has a hole 82 therein which communicates with the bottom of hole 81 to accommodate one of the bimorph electrical leads. The structure of the body 69 is illustrated in the isometric view of FIG. 5. The lead 84 is attached to the right-hand end of insert 86 through hole 82. The insert 86 makes contact with the right-hand bimorph electrode along its periphery. The lead 84 runs down the bore through recess 83 to the control circuitry. The other bimorph electrode contacts the projection 86 which makes contact to the bore wall 72 which is grounded.

The bimorph was chosen for this application because of its large deflection when energized and for its resilience which permits the power-off clamping action as explained above.

The tip holder 41 rides atop the upper clamp 71 as shown in FIG. 2. To provide coarse Z-axis motion to the tip 43, the vertical crawler walks up or down the bore 70 by the coordinated clamping and unclamping of the upper and lower clamps and the expansion and contraction of the PZT 67, which joins these two clamps. Thus to move upward, PZT 67 is expanded with the lower clamp "on" and the lower one switched "off". Then the upper clamp is switched "on" and the lower one switched "off", and the PZT then contracted. It should be noted that the deenergized clamps can be moved by the PZT 67 notwithstanding the clamping force provided by the resilience of the bimorphs. If desired, this power-off clamping force can be removed during walking by applying an oppositely-polarized voltage to the bimorph, as explained above.

Electrostatic clamps such as those used in the walker assembly 5 and in the aforementioned Sakitani patent are unsuitable for this vertical crawler since they do not provide enough clamping force to overcome the gravity of the crawler assembly, and also they cannot provide any residual clamping force when switched off. This residual clamping force is necessary to prevent the crawler assembly from falling down within the bore whenever the power goes off.

In operation, the tip-to-sample distance is brought to within tunneling range by raising the vertical crawler while keeping the fine Z-axis PZT 37 extended. A tip-to-sample bias voltage of a few volts allows the tunnel current to be detected at a somewhat large gap. As soon as this current is detected, the fine Z motion PZT is contracted to its equilibrium length and the crawler then raised further to take up the distance through which the fine Z axis PZT contracted. The upper clamp of the crawler is then clamped and the PZT 67 contracted by removing the voltage therefrom, followed by the clamping of the bottom clamp 69. The fine motion scanning in all three dimensions can then proceed, as explained above. It should be noted that this apparatus and scanning technique does not subject the walker assembly to any forces which would bend or deform it in any way.

This walker assembly has a structure similar to that described in the aforementioned *Review of Scientific Instruments* article; however, that prior art STM stage is capable only of fine motion along the X, Y and Z axes and is thus not capable of coarse motion since its four corner blocks are fixed. Also, the tip is carried by the fine-motion array. The moving of a cantilevered tip at high speed can cause it to bend and sway due to inertial forces thereon. In the present invention the tip is held stationary during scanning while the flat sample is moved relative thereto. In some applications of the present invention it may be desirable or necessary to mount the tip on the walker assembly and the sample atop the vertical crawler. This can be done with a wire-type tip if the scanning speed is kept low, or it can be done at high scanning speed if a more rigid tip is used, for example a pyramid-shaped tip with a small altitude and a large base.

FIG. 3 is a diagram of one type of circuit which can be used to operate the walker assembly 5 of FIGS. 1 and 2. This circuit comprises a computer 101 with eight outputs, each of which is connected to a separate control channel. Each control channel comprises a digital-to-analog converter and a power amplifier. For example, the upper control channel 113 comprises the digital-to-analog converter (DAC) 105 to which the computer output 103 is applied, and power amplifier 107. channel 113 is connected to and actuates the foot 19. All four of the feet have separate control channels, the feet 15, 18, and 16 being respectively connected to control channels 117, 123, and 127. Since each of the four linear arrays of PZTs (47, 49, 51, etc.) have all three of their PZTs operated in unison, each of these arrays can be operated in parallel from a single control channel. For example, the array comprising PZTs 47, 49 and 51 are all connected in parallel to control channel 119, and the X-axis PZTs 43, 53, and 62 are all connected to control channel 115 which comprises DAC 109 and amplifier 111. The computer 101 would be programmed to provide the required sequence of digital words or numbers at its outputs to achieve the desired motion of the walker assembly. These digital outputs are converted to analog voltages by the DACs and amplified by the power amplifiers and then applied to the PZTs and to the electrostatically-operated feet.

While the invention has been described in connection with illustrative embodiments, obvious variations therein will be apparent to those skilled in the art, accordingly the invention should be limited only by the scope of the appended claims.

What is claimed is:

1. A tunneling microscope for scanning a sample comprising:
   a movable sample stage comprising: a square array of blocks connected by piezoelectric transducers, said stage being adapted for movement in the x-y plane on a horizontal surface, the corner blocks of said array having clampable feet attached thereto; and means to coarsely move said stage in said x-y plane by alternately clamping and unclamping pairs of said feet while linear groups of said transducers are electrically expanded and contracted,
   means to provide for fine x-y plane motion of the center block of said array of blocks, having the sample attached to its underside, by clamping all four of said feet to said horizontal surface and simultaneously expanding one linear group of said transducers while contracting a parallel linear group of said transducers, and
   means, including a tunneling tip, positioned beneath said sample and coarsely movable in a vertical direction relative to said x-y plane.

2. The apparatus claim 1: wherein said stage comprises nine ceramic blocks connected by twelve piezoelectric transducers; wherein said horizontal surface comprises the upper surface of a base unit; and wherein said coarsely movable means is supported in a vertical bore in said base unit.

3. The apparatus of claim 2 wherein said sample is supported on a fine-motion Z-axis piezoelectric transducer which is attached to said center block and wherein said tip is supported atop a vertical crawler device comprising a further piezoelectric transducer with electrically-operable clamps on either end thereof, said vertical crawler being mounted in said bore and being capable of moving up or down therein by the expansion and contraction of said further transducer together with coordinated clamping and unclamping of said electrically-operable clamps.

4. A scanning tunneling microscope comprising,
   a base unit with a horizontal upper surface and with a vertical bore therein, a tunneling tip mounted on a piezoelectrically driven device movable with up or down motion in said bore,
   a walker assembly mounted on said horizontal surface, said walker assembly Comprising a square array of nine blocks connected by twelve piezoelectric transducers with feet attached to the corner blocks of said array, said feet being selectively clampable to said horizontal surface, a sample-to-be-studied supported on the underside of said walker assembly adjacent said tip, and
   means to apply electrical signals to linear groups of said transducers and to selected pairs of said feet whereby said walker assembly may be coarsely moved in the horizontal (X-Y) plane, and
   whereby all of said feet may be clamped to said horizontal surface and linear groups of said transducers electrically actuated to scan said sample in horizontal plane.

5. The apparatus of claim 4 further comprising control means for attaining coarse motion along either the X or Y axis by unclamping the two leading feet in the desired direction of motion, clamping the other two lagging feet, expanding the two linear groups of transducers which are perpendicular to the axis of desired motion, then unclamping the said other lagging feet, clamping the two said leading feet, contracting the same two linear groups of transducers to complete one step, and for attaining fine X-Y plane motion by clamping all four feet while alternately expanding and contracting the linear groups of transducers which are perpendicular to the axis of the desired fine motion.

6. The apparatus of claim 4 wherein said blocks comprise lightweight machinable glass-ceramic.

7. A movable stage for a scanning tunneling microscope comprising a square array of nine blocks joined by twelve piezoelectric transducers, means to attach a sample-to-be-studied to the underside of the center block of said stage, the four corner blocks of said stage having feet attached thereto, which feet can be electrically clamped to the horizontal surface on which said stage is mounted, and control means (i) to apply electrical clamping signals to pairs of said feet and to linear groups of said transducers whereby said stage may be coarsely moved in any direction on said horizontal surface, (ii) to apply electrical clamping signals simultaneously to all four of said feet, and (iii) to simultaneously electrically expand and contract the linear groups of said PZTs on either side of said center block, whereby said center block and sample may be scanned in any direction parallel to said horizontal surface.

8. A scanning tunneling microscope including a vertical crawler having as base unit with a vertical bore therein and comprising, a piezoelectric transducer and upper and lower electrically-operable clamps at opposite ends thereof and mounted inside of said vertical bore, said clamps being capable of providing transverse clamping action against the inside wall of said bore when switched "off" sufficient to counteract the gravity of said crawler, and when switched "on" to provide either increased or decreased clamping action, and wherein said crawler can be made to walk up or down against said wall of said bore by expanding and contracting said transducer with the coordinated switching "on" and "off" of said clamps, and a tunneling tip mounted on said crawler;

9. The scanning tunneling microscope of claim 8 wherein each of said clamps comprises a body with a horizontal hole therein, said transducer is a bimorph-type transducer, and further comprising a piston mounted in said hole in such a way that the resilience of said bimorph-type transducer forces said piston against the wall of said bore to provide said clamping action when switched "off".

10. A scanning tunneling microscope including a vertical crawler capable of climbing up or down a vertical bore and comprising: a piezoelectric transducer with electrically-operable clamps at either end thereof, said clamps comprising means when energized to electrically expand to provide positive clamping to the inside wall of said bore and further comprising resilient means to provide clamping to said wall with less force when de-energized, and a tunneling tip mounted on said crawler.

11. A scanning tunneling microscope including a vertical crawler capable of climbing up or down a vertical bore and comprising:

a piezoelectric bimorph transducer with electrically-operable clamps at either end thereof, each of said clamps comprising resilient means to provide a given clamping force against the inside wall of said bore when de-energized, and each of said clamps further comprising means when energized to electrically expand or contract to provide, respectively, either an increase or a decrease in said given clamping force, and 12. A scanning tunneling microscope comprising a base unit having a horizontal upper surface and a vertical bore therein, a walker assembly mounted on said horizontal surface and comprising an array of blocks interconnected by piezoelectric transducers, the central one of said array of blocks being positioned over said bore, and certain of said blocks having clamping feet resting on said upper surface, a piezoelectric element connected to said central one of said blocks for positioning a sample in said bore, and a vertical crawler device positioned in said bore and supporting a tip adjacent said sample, said crawler device comprising a body with a horizontal hole therein, a bimorph piezoelectric transducer positioned within said hole, and a piston within said hole and mounted such that the resilience of said bimorph transducer forces said transducer against the wall of said bore, wherein said walker assembly provides either coarse or fine movement in the X-Y directions for said microscope, said crawler provides coarse movement in the Z direction, and said piezoelectric element provides fine motion in said Z direction.

13. A scanning tunneling microscope in accordance with claim 12 further comprising a lower vertical crawler device positioned in said bore below said vertical crawler device supporting said tunneling tip, said lower crawler device comprising a body with a horizontal hole therein, a bimorph piezoelectric transducer positioned within said hole, and a piston within said hole and mounted such that the resilience of said bimorph transducer forces said transducer against the wall of said bore, and a further piezoelectric element positioned between said vertical crawler supporting said tip and said lower vertical crawler device.

14. A tunneling microscope for scanning a sample comprising, a base unit having a horizontal upper surface and a vertical bore within said surface, a walker assembly mounted on said surface and comprising an array of blocks interconnected by piezoelectric transducers, a piezoelectric transducer connected to the underside of the central block of said array for attaching the sample and for positioning the sample in said bore, a device positioned below the sample in said bore, wherein said device includes a tunneling tip with said device arranged for positioning said tip within a predetermined tunneling distance from the sample and for maintaining said tip in a stationary position at said tunneling distance, said walker assembly being piezoelectrically driven, by selectively expanding and contracting those of said piezoelectric transducers connected to said central block and said piezoelectric transducer associated with the sample, to provide three dimensional fine movement of the sample relative to said stationary tip, and wherein said walker assembly further comprises clampable feet attached to the corner blocks of said array, and means to coarsely move said walker assembly in the X and Y dimensions through alternately clamping and unclamping the opposite pairs of said feet and said coarsely moving means providing positioning of a predetermined region of said attached sample over said stationary tip.

* * * * *

UNITED STATES PATENT AND TRADEMARK OFFICE
CERTIFICATE OF CORRECTION

PATENT NO.   : 4,814,622

DATED        : March 21, 1989

INVENTOR(S)  : Stephen Gregory and Charles T. Rogers, Jr.

It is certified that error appears in the above-identified patent and that said Letters Patent is hereby corrected as shown below:

```
Column 4, line 41, "33" should read --13--.
Column 6, line 11, "81 A" should read --81. A--.
Column 8, line 11, "x-y" should read --X-Y--;
         line 14, "x-y" should read --X-Y--;
         line 18, "x-y" should read --X-Y--;
         line 27, "x-y" should read --X-Y--;
         line 51, "Comprising" should read --comprising--.
Column 9, line 5, "feet, contracting" should read --feet, then contracting--;
         line 49, "crawler;" should read --crawler.--.
Column 10, line 12, "and" should read --and a tunneling tip mounted on said
     crawler.--.
```

Signed and Sealed this

Nineteenth Day of May, 1992

Attest:

DOUGLAS B. COMER

Attesting Officer        Acting Commissioner of Patents and Trademarks